United States Patent [19]

Johansson

[11] 4,126,332

[45] Nov. 21, 1978

[54] TRANSPORT VEHICLE

[75] Inventor: Anders Johansson, Bohus Björko, Sweden

[73] Assignee: Salen & Wicander Terminalsystem AB, Vastra Frolunda, Sweden

[21] Appl. No.: 767,212

[22] Filed: Feb. 9, 1977

[30] Foreign Application Priority Data

Feb. 26, 1976 [SE] Sweden .............................. 7602454

[51] Int. Cl.² .......................................... B60G 11/28
[52] U.S. Cl. .................................. 280/683; 267/65 D; 280/43.16; 280/714
[58] Field of Search ............... 280/43.12, 43.13, 43.16, 280/43.23, 104, 678, 683, 112 R, 112 A, 709, 714; 267/65 D

[56] References Cited

U.S. PATENT DOCUMENTS

| 3,331,458 | 7/1967 | Van Raden | 280/112 R |
|---|---|---|---|
| 3,451,692 | 6/1969 | Kappe | 280/678 |
| 3,578,352 | 5/1971 | Heine | 280/43.23 |
| 4,006,913 | 2/1977 | Rimhagen | 280/43.23 |

Primary Examiner—Joseph F. Peters, Jr.
Assistant Examiner—John A. Carroll
Attorney, Agent, or Firm—Cantor and Singer

[57] ABSTRACT

A low transport vehicle has a platform carried by a number of wheels arranged in a transverse row, hydraulic means being provided to raise and to lower the platform. In order to prevent a tilting of the cargo during voyage with the platform with respect to the wheels in raised position, the hydraulic system is arranged in such a manner that a ram operating an outward wheel in the row may be blocked-off from the system if the pressure in the system at the opposite end of the row falls below a predetermined value.

4 Claims, 3 Drawing Figures

TRANSPORT VEHICLE

BACKGROUND OF THE INVENTION

The present invention refers to a transport vehicle comprising a load carrying platform and wheels carrying the latter, said wheels being arranged in at least one row transversely located with respect to the platform, the platform being adapted to be raised and lowered with respect to the wheels by means of hydraulic piston rams.

Vehicles for the handling and transportation of shipping containers and other heavy pieces of cargo have been developed, the aim being to design the vehicle so it can be pushed in below the cargo, for instance a pile of containers resting on a fixed support, or a pallet which is brought along during the transport. Such vehicles may also be used for other type of heavy or high loads, for instance loaded railway wagons.

In order to make possible such handling it is essential to be able to raise and to lower the platform of the vehicle, and furthermore that the height of the platform, in lowered position is small, so the vehicle can be pushed in below pieces of cargo supported close by the ground. To that end the vehicle is provided with small-diameter wheels, and on account of the heavy loads to be carried, a large number of wheels are required.

When the platform is brought to its raised position the wheels may be elastically supported by the rams if the latter are connected in parallel to at least one source of pressure fluid supply.

Especially when handling cargo stowed in a high pile, it is essential to be able to stabilize the platform of the vehicle in order to prevent tilting of the cargo, for instance when the vehicle is moving through a curve. On such occasion a resultant of the force of gravity and that of centrifugal action may be directed away from the center of the vehicle.

SUMMARY OF THE INVENTION

In order to prevent tilting of the cargo it is according to the invention proposed that at least two wheels, or groups of wheels are mounted to each side of the longitudinal center line of the vehicle, and that each wheel, or group of wheels, is connected to one ram, that the plant for supplying pressure fluid to the rams includes two circuits normally operating independently of each other, of which circuits one is connected to rams located to one side of said longitudinal center line, and the other circuit is connected to rams located to the other side thereof, that a valve, normally maintained in its open position, is fitted in a conduit connected to the high pressure sides of rams pertaining to each circuit, and that a conduit from each of said valves is connected to, and adapted to sense the pressure in the opposite circuit, each valve being adapted to close its connection conduit when the pressure in the opposite circuit, with a predetermined value, sinks below the pressure in its own circuit.

DESCRIPTION OF A PREFERRED EMBODIMENT

Figure 1:
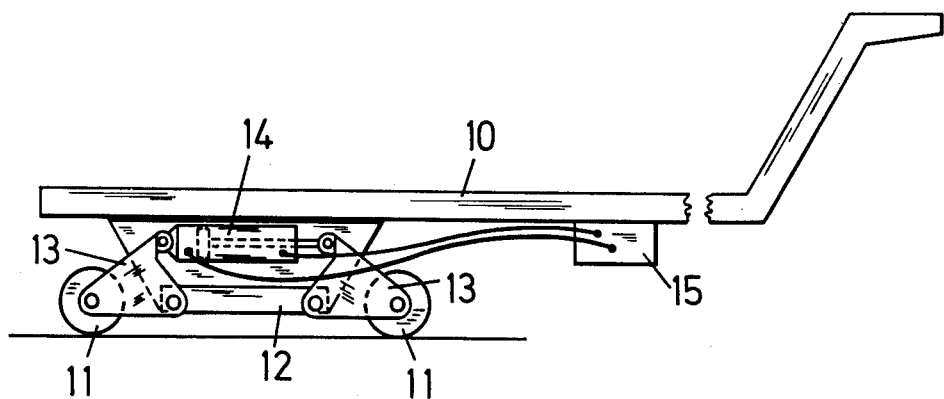
FIG. 1 schematically shows a vehicle adapted for handling heavy loads.
Figure 2:
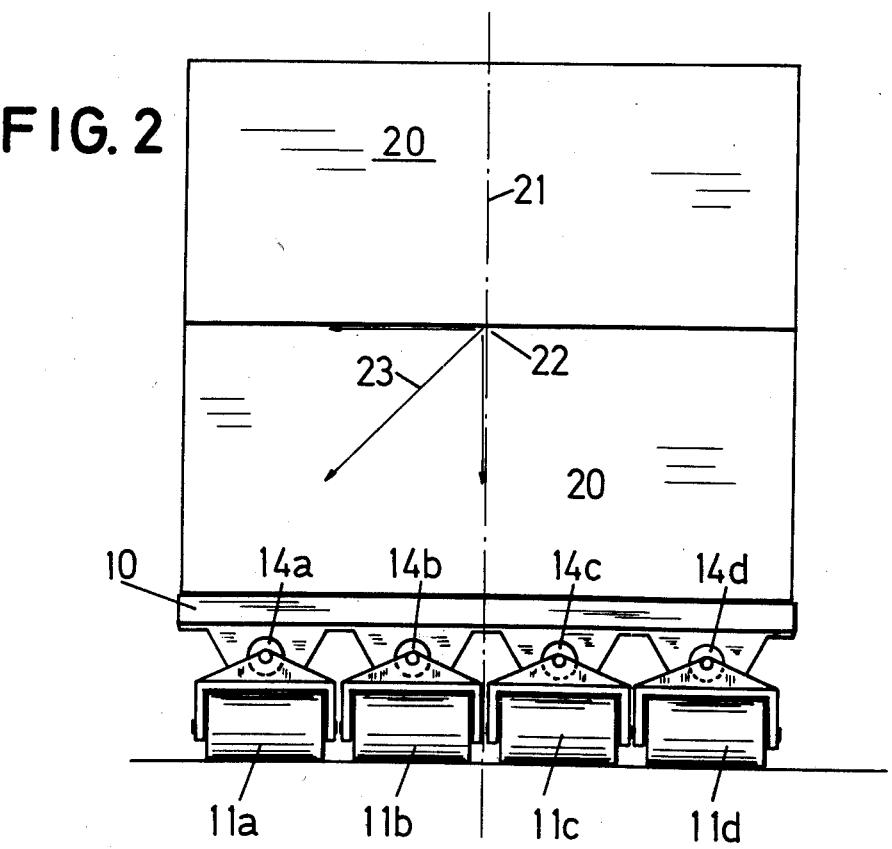
FIG. 2 shows the vehicle as viewed from behind.

The vehicle shown in FIGS. 1 and 2 is provided with a platform 10, which may be raised and lowered with respect to wheels 11 carrying the same. The wheels 11 are mounted in pairs on brackets 12 by means of bell crank levers 13. A piston type ram 14 is fitted between two levers mounted at the same bracket, the cylinder of the ram being connected to one of the arms, and the rod of the piston being connected to the opposite arm.

The rams are supplied with pressure fluid from a pump, generally denoted by 15 in the conventional manner. When the rams 14 are supplied with pressure fluid the top ends of arms 13 will diverge, the wheels 11 being swung downwardly with respect to the pivots at bracket 12, i.e. in reality the platform will be raised in relation to the ground. When the vehicle is moving the load will be resiliently supported by the pressure fluid in the rams.

FIG. 2 shows the vehicle as viewed from the rear, and loaded with a number of containers 20 arranged in two layers. The wheels are arranged in such a manner that there are two pairs of wheels 11 $a$ and 11 $b$ located to the left of a longitudinal center line 21 through the loaded vehicle, and two pairs of wheels 11 $c$, 11 $d$ in the opposite side thereof.

It may be supposed that the center of gravity 22 of the load will be located at this centerline.

When the vehicle is performing a narrow turn, for instance to the right in the drawing, the force of centrifugal action tends to move the center of gravity outwards, i.e. on this occasion to the left. The resultant 23 formed by the combination of the force of gravity and of the centrifugal action will act obliquely downward towards the left, i.e. the left longitudinal side of the vehicle will be forced downwards, and a tilting tendency occurs. Something similar would happen if one of the right hand, outward wheels should run over a steep, local rise in the ground.

An increase of the load at one longitudinal side of the vehicle will bring about a corresponding reduction in the load at the opposite side. By sensing changes in the pressures within the fluid system, and as a result thereof, blocking those outward wheels which are subjected to extra loads, it is possible momentarily to put the hydraulic suspension out of action for these wheels, and to bring about a practically rigid mounting for them.

Figure 3:
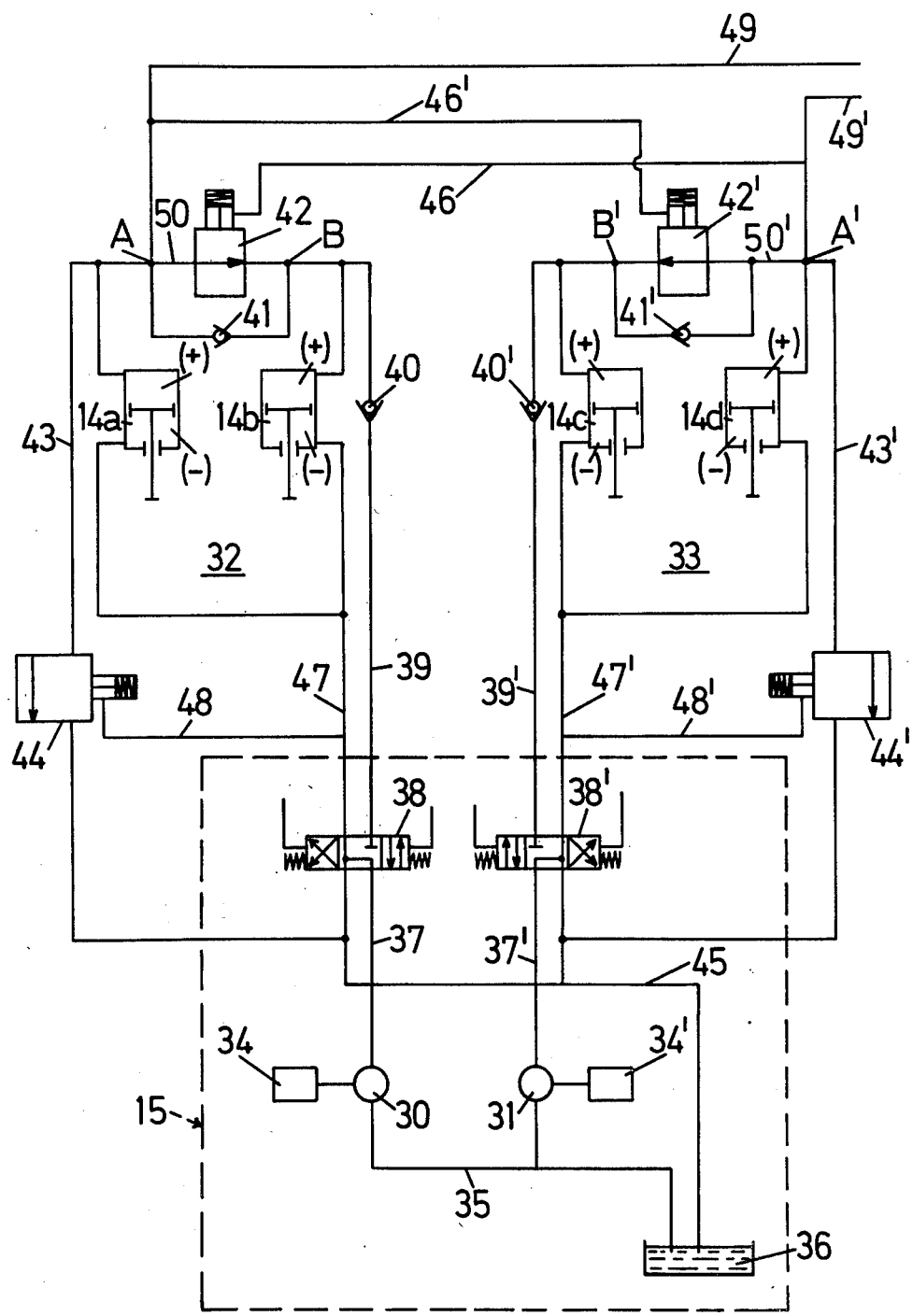
FIG. 3 is a simplified pressure fluid circuit arrangement for the platform and the carrying wheels of the vehicle.

A hydraulic system suited for such purpose is illustrated in FIG. 3.

In FIG. 3 two pumps 30 and 31 are shown, pump 30 being connected to a pressure fluid circuit 32, whereas pump 31 is connected to a circuit 33. Circuit 32 serves rams 14 $a$, 14 $b$ located to one side of the longitudinal center line of the vehicle, and circuit 33 serves rams 14 $c$ and 14 $d$ located to the opposite side thereof. Pumps 30 and 31 are individually driven by motors 34, and have equal capacity.

As the other components forming part of circuits 32 and 33 are identical, and the circuits are mirror images of each other, circuit 32, only, will be described. The same reference numerals are used in both circuits, the components belonging to circuit 33 being provided with a suffix.

The suction side of pump 30 is connected to a receptacle 36 of a hydraulic fluid, for instance oil, by way of a conduit 35. The pressure side of the pump is, by way of a further conduit 37 connected to a shift-over valve 38 adapted to put conduit 37 in connection with the high-pressure side (+), or the low-pressure side (−) of the pertaining rams. The shift-over valve is in FIG. 3 shown in a neutral position.

A conduit 39 connects, by way of a non-return valve 40, shiftover valve 38 with the high-pressure side of ram 14 b, being the inward one of the two rams connected to this circuit. A connection from shift-over valve 38 to the high-pressure side of the outward cylinder 14a is obtained by way of a further non-return valve 41, connected in parallel to a pilot valve 42, fitted between rams 14 a and 14 b. This pilot valve is normally maintained in its open position, and will then permit flow of fluid from the outward to the inward ram. A return flow conduit 43 from the high pressure sides of the rams is by way of a further, normally closed pilot valve 44 connected to a conduit 45 leading to receptacle 36.

First pilot valve 42 is governed by means of a conduit 46, sensing the pressure in conduit 43', and valve 42 is designed in such a manner, that it will cut the connection between points A and B in an upper branch conduit 50 in FIG. 3, when the pressure in conduit 43' sinks below a predetermined level.

The low-pressure sides of rams 14 a, 14 b are connected to shiftover valve 38 by way of a conduit 47.

Pilot valve 44 is connected to conduit 47 by way of a branch conduit 48 and is governed by the pressure in this branch conduit in such a manner, that it will be opened, when the pressure in conduit 47 raises above a predetermined level.

The pressure fluid circuit described operates, in short, in the following manner. The rams located to both sides of the center line of the vehicle may be operated individually by means of pump 30, 31, but it is presupposed that the pumps have equal capacity, and that they are driven simultaneously and uniformly. When the platform of the vehicle has been brought in below a load, the pumps are started, whereupon the platform will be raised in parallel to the ground.

The shift-over valves 38, 38' will then have been brought outwards, i.e. at the left circuit 32 to the left, whereby the high-pressure sides (+) of the rams are supplied with pressure fluid by way of conduit 39, while the low-pressure sides (−) of the rams are evacuated by way of conduit 47.

Valve 42 occupies its open position shown in FIG. 3, while valve 44 is closed depending upon the pressure in conduit 47 not amounting to the value required for opening this valve. The high-pressure sides of rams 14 a and 14 b communicate in both directions by way of valve 42 and non-return valve 41, respectively. The load will thus, as above mentioned, be elastically suspended.

If now the pressure in conduit 43' should fall below a predetermined level, which will happen if the load upon platform 10, when the vehicle passes through a narrow curve, tends to tilt, this reduction will be sensed by conduit 46, and valve 42 will be closed due to the biasing of a built-in spring. In this manner the position of the piston in the outward ram 14 a will be blocked, as outflow of fluid from its high-pressure side is prevented by valve 42 (valve 44 remaining closed), and by the non-return valve 41.

The position in the vertical direction of wheels 11 a on the corresponding side of the platform will hereby be fixed, and a further tilting of the load upon platform 10 is prevented.

The situation will be the same in the right circuit 33, if the pressure in conduit 43 should sink below the predetermined value. A signal to the driver of the vehicle, that some wheels have been blocked, is simultaneously transferred by way of conduits 49, 49'.

When the platform shall be lowered shift-over valves 38, 38' are moved inwards, whereby the pressure sides of the pumps are connected to conduits 47, 47'. When the pressure in these conduits increases valves 44, 44' will open and fluid may flow out of the high-pressure sides of the rams to receptable 36.

The components may be varied in many ways within the scope of the appended claims. The number of pairs of wheels will have to be selected taking the breadth of the vehicle and the maximum load to be carried into consideration. As the space in the vertical direction on many occasions is limited each of the rams 14 a–d may be substituted by a pair of rams connected in parallel. The circuits are, as usual, provided with pressure maintenance valves, but such details have not been shown, as they are well known in the art.

In the specification above the rams have been referred to as having a high-pressure side (+) and a low pressure side (−). The rams are of the conventional, double acting type, and when pressure fluid is supplied to one side of the ram, spent fluid will be ejected from the opposite end of the ram.

The expression high-pressure side (+) is used to indicate where pressure fluid is supplied for raising the platform and the cargo. The weight of the cargo and the platform will usually be sufficient to make the platform sink down, but in order to ensure an even movement, some pressure fluid is supplied to the low-pressure sides (−) of the rams. It is evident that the opposite ends of the rams — i.e. ordinarily the high-pressure sides — during such operation are not supplied with pressure fluid, but just are effluens.

What I claim is:

1. In a transport vehicle comprising a load carrying platform and wheels carrying the same, said wheels being arranged in at least one row, transversely located with respect to the platform, the improvement comprising:
   (A) a plurality of double acting, hydraulic piston rams, each having a high-pressure side and a low-pressure side,
   (B) means for mounting at least two wheels to each side of the longitudinal center line of the vehicle, each wheel being connected to one of said rams,
   (C) means for feeding pressure fluid to said rams including two circuits, each circuit including supply and return flow conduits, normally operating independently of each other, of which circuits one is connected to rams located to one side of said longitudinal center line, and the other circuit is connected to rams located to the other side thereof,
   (D) a valve means in a portion of each of said conduits being connected to the high-pressure sides of the corresponding rams in said conduits, each of said valve means including means for exerting a predetermined biasing force to maintain said valve means in its open position, and
   (F) a pressure sensing conduit communicating each of said valve means with a high-pressure portion of the opposite circuit, to close either of said valve means, upon the pressure in the opposite circuit sinking below a predetermined value.

2. The vehicle according to claim 1, in which the valve means is a pilot valve, which in its open position permits flow of fluid from a ram, located outwardly in the row of wheels, towards a ram located closer by the center line of the vehicle, a non return valve being connected in parallel to the pilot valve to permit flow of fluid in the opposite direction.

3. The vehicle according to claim 1, in which each pressure fluid circuit includes a second pilot valve fitted in a return flow conduit from the high-pressure sides of the corresponding rams, and being normally maintained in its closed position, said second pilot valve being governed by the pressure reigning at the low-pressure sides of the rams.

4. The vehicle according to claim 1, in which each pressure fluid circuit is fed by a pump of its own, and that a switch-over valve is fitted in a conduit from the pump to the rams corresponding to the circuit in question, said switch-over valve being adapted in one position to feed pressure fluid to the high-pressure sides (+) of the rams for raising the platform, and in a second position to feed pressure fluid to the low-pressure sides (−) for lowering the platform.

* * * * *